O. HAMMERSTEIN.
MACHINE FOR STRIPPING AND BOOKING TOBACCO LEAF.
APPLICATION FILED NOV. 21, 1913.
1,133,799.
Patented Mar. 30, 1915.
2 SHEETS—SHEET 1.
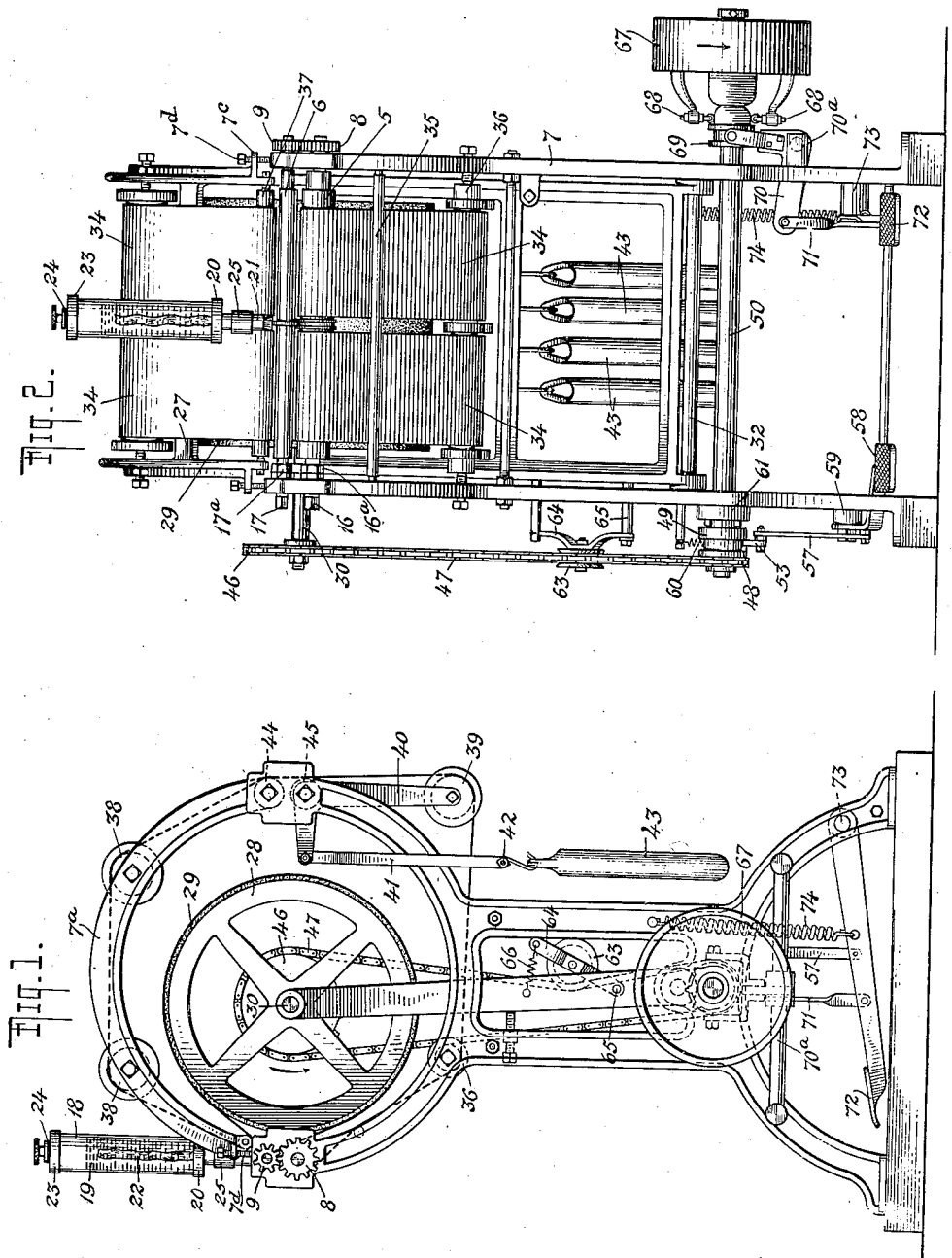
WITNESSES
INVENTOR
OSCAR HAMMERSTEIN
BY
ATTORNEYS

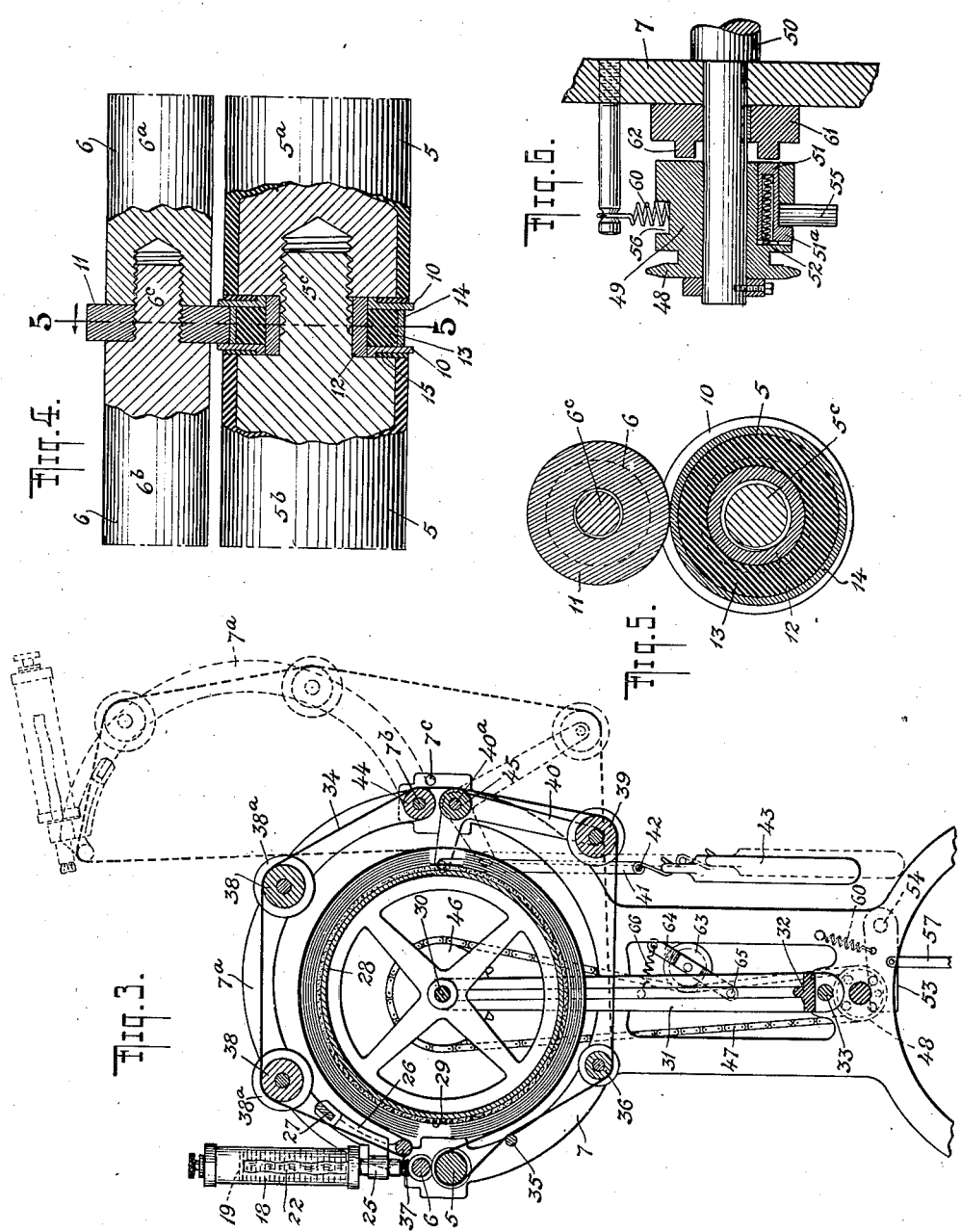

UNITED STATES PATENT OFFICE.

OSCAR HAMMERSTEIN, OF NEW YORK, N. Y.

MACHINE FOR STRIPPING AND BOOKING TOBACCO-LEAF.

1,133,799. Specification of Letters Patent. Patented Mar. 30, 1915.

Application filed November 21, 1913. Serial No. 802,187.

*To all whom it may concern:*

Be it known that I, OSCAR HAMMERSTEIN, a citizen of the United States, and resident of the borough of Manhattan, city, county, and State of New York, have invented certain new and useful Improvements in Machines for Stripping and Booking Tobacco-Leaf, of which the following is a specification.

My invention relates to machines for stripping and booking tobacco leaf and has for its object to provide a machine of this type with a simple and effective stripping mechanism and with an improved booking mechanism adapted to receive the stripped tobacco leaf and book the same in an effective and continuous manner.

Other objects of my invention will appear from the description hereinafter and the features of novelty will be pointed out in the appended claims.

Reference is to be had to the accompanying drawings in which—

Figure 1 is a side elevation of my improved machine; Fig. 2 is a front elevation thereof; Fig. 3 is a central cross-section of said machine; Fig. 4 is a detail view partly in section of the stripping mechanism; Fig. 5 is a cross-section thereof on the line 5—5 of Fig. 4 and Fig. 6 is a detail sectional view of a clutch used in my improved construction.

The stripping mechanism forming part of my improved machine comprises superimposed rollers 5 and 6 suitably journaled in the main frame 7 of the machine and preferably in operative connection with each other through the medium of pinions 8 and 9. The roller 5 is provided with cutting knives 10 spaced from each other while the roller 6 is provided with the cutting disk 11 adapted to extend between the knives 10 and coöperate therewith to strip the tobacco leaf in the manner to be more fully described hereinafter, it being understood that in some cases the arrangement may be reversed and the knives 10 located on the roller 6 and the cutting disk 11 on the roller 5, and further that in either case two separate knives may be substituted for the disk 11 to coöperate with the knives 10. In the illustrated form of the invention the rollers are constructed to accommodate cutting mechanism of different relative arrangement whereby stems of different width may be readily cut or stripped from the leaf with a minimum of waste. To this end the rollers 5 and 6 are made in two sections $5^a$, $5^b$, $6^a$ and $6^b$, the sections $5^b$ and $6^b$ being provided with screw threaded stems $5^c$ and $6^c$ adapted to screw into internally screwthreaded apertures in the sections $5^a$ and $6^a$. With this construction knives 10 surround a bushing 12 carried by the stem $5^c$ and maintaining the ends of the roller sections $5^a$ and $5^b$ in proper spaced and rigid relation to each other. A rubber or other yielding ring 13 extends about the bushing 12 between the knives 10 and is surrounded by a metal ring 14 for the purpose to be more clearly described hereinafter, suitable washers 15 being provided between the knives 10 and the end faces of the roller section $5^a$ and $5^b$ if desired. With the construction being described the cutting disk 11 may screw upon the stem $6^c$ or may simply be slipped thereover and in any case is clamped between the opposing end faces of the roller sections $6^a$, $6^b$. In order to permit differently arranged cutting means to be readily substituted the roller sections $5^b$ and $6^b$ are journaled in the frame 7 in such a manner as to be readily removable therefrom, the sections $5^a$ and $6^a$ being either similarly journaled or as shown being arranged to remain in the frame 7. In the illustration the means for permitting the easy arrival of the sections $5^b$—$6^b$ comprises bolts 16 and 17 in screwthreaded engagement with the frame 7 and forming a bearing about which the roller sections $5^b$, $6^b$ are adapted to rotate, suitable lock nuts $16^a$ and $17^a$, being provided for securing the bolts 16 and 17 in an adjusted position.

In order that the cutting means may at all times be kept free and clean and in an operative condition, I may provide a receptacle 18 adapted to contain water or other suitable liquid 19 and having its one end provided with a cap 20 and a tubular extension 21. A wick or the like 22 extends through said extension 21 into the liquid 19 and is positioned in the receptacle 18 in such a manner that one end of the wick projects beyond the mouth of the tubular extension 21. The receptacle 18 may further be provided with a cap 23 having an opening through which the liquid may be introduced, said opening being normally closed by means of a removable stopper 24 of any desired type. When in its operative position, the receptacle 18 is supported in an inverted position with the tubular extension 21 extending through a sleeve 25 and the projecting end of the wick 22 resting upon the cutting disk 11. The sleeve 25 forms part of or is secured to an arm 26 carried by a cross-bar 27 rigidly mounted on an auxiliary frame 7ª which is pivoted at 7ᵇ upon a main frame 7 as shown in Figs. 1 and 3. In the arrangement shown and described the extension 21 is capable of sliding in the sleeve 25 so that the end of the wick 22 will always be maintained in proper operative engagement with the cutting disk 11 by the weight of the receptacle 18.

The auxiliary frame 7ª is provided with projections 7ᶜ through which adjusting screws 7ᵈ extend, the ends of which are adapted to rest upon the main frame 7 for supporting the front end of said auxiliary frame 7ª when in its normal position as shown best in Fig. 2.

A separate cleaning or wiping device may be provided for the knives 10 or the action of the wick 22 or the liquid passing therefrom may simply be relied on to keep the knives 10 in an operative and clean condition.

The booking mechanism as shown in the present illustration of the machine comprises a drum 28 preferably covered with felt or other cushioning material 29 whereby injury to the tobacco leaf by direct contact with the drum surface during booking is prevented. The drum 28 is carried by a shaft 30 or may be simply provided with trunnions extending from opposite end faces, the said shaft or trunnions as the case may be, being journaled in arms 31 preferably connected by a cross-bar 32 to form a rigid frame, as shown in Figs. 2 and 3. These arms 31 are pivoted at 33 upon the main frame 7 so that said drum 28 is capable of a swinging movement toward and away from the cutting mechanism comprising the rollers 5 and 6 for the purpose to be more clearly described hereinafter. A pair of endless belts or aprons 34 pass around the drum 28 and around the roller 5 at oppositte sides of the cutters 10 and further pass over rollers 35 and 36 journaled on the main frame 7, Said belts or aprons also pass around a roller 37 and over guide rollers 38 rotatably mounted on the auxiliary frame 7ª, the rollers 38 being preferably provided with flanges 38ª for maintaining said belts or aprons in constant paths. In order that the belts or aprons 34 may at all times be maintained under tension or in proper operative relation to the drum, I conduct the said belts or aprons over a tension roller 39 preferably flanged in the same manner as the rollers 38 and journaled upon bell crank levers 40 pivoted at 40ª upon a main frame 7. Links 41 are suspended from the said bell cranks and serve to support a cross bar 42 on which one or more weights are detachably hung for maintaining the tension roller 39 against the said aprons 34 to keep them always under the required tension. In addition to this, the said aprons 34, if desired, may pass over rollers 44 and 45 arranged to rotate about the pivots 7ᵇ and 41. A sprocket wheel 46 is fixed upon the drum shaft 30 and is connected by means of a sprocket chain 47 with a second sprocket wheel 48 secured to or forming part of a clutch member 49 loosely mounted on a driving shaft 50 journaled on the main frame 7. As shown best in Fig. 6 of the drawings, the clutch member 49 is provided with a plunger 51 and a coiled spring 52 having a tendency to move said plunger 51 outwardly relatively to the clutch member 49. This plunger 51 is maintained in its retracted position against the tension of the spring 52 by means of a member 53 pivoted at 54 upon the main frame 7 and having an inclined cam face 55 normally extending into a circumferential groove 56 formed on the clutch member 49 and engaging a lug 51ª of the plunger 51. The member 53 is operatively connected by means of a link 57 with a treadle 58 pivoted at 59 upon the main frame 7 and normally held in its raised position by means of a spring 60 connected with the member 53 and whereby the free end of the latter is also maintained in the groove 56. A second clutch member 61 is fixed upon the driving shaft 50 and is provided with diametrically opposite projections 62 adapted to coöperate with the plunger 51 to couple the clutch member 49 with the member 61 and driving shaft 50 when the treadle 58 is actuated to start the machine. If desired a tension roller 63 mounted on a member 64 pivoted at 65 upon one arm 31 and under the influence of a spring 66 may be provided for taking up any slack in the sprocket chain 47 and for insuring a perfect operative adjustment thereof at all times.

With the clutch mechanism and gearing so far described and shown, the drum 28 is given a half revolution each time the treadle 58 is actuated and is then automatically brought to a standstill as will be more fully described hereinafter. If no other control of the drum than this is desired, a belt pulley 67 may be fixed upon the driving shaft 50 and may be driven from any desired source to actuate the shaft 50 and connected mechanism. Under certain conditions, however, it may be found of advantage to stop the rotative movement of the drum 28 at some point before the completion of each half revolution in which case the belt pulley 67 is loosely mounted on the shaft 50 and a clutch 68 may be provided which in its normal condition operatively connects the said pulley 67 with the shaft 50. This clutch 68 is controlled by means of a collar 69 slidably mounted on the shaft 50, but adapted to rotate therewith and connected with the forked end of a bell crank lever 70 pivoted at 70ª upon the main frame 7. The bell crank lever 70 is connected through the medium of a link 71 with a treadle 72 pivoted at 73 upon the main frame 7 and maintained in its normal inoperative or raised position by means of a spring 74. This treadle 72 serves to actuate or release the clutch 68 when desired in a manner which will be more fully brought out in the description.

The operation of the machine is as follows: After the driving shaft 50 has been set in motion through the medium of the pulley 67 and it is desired to start the machine, the treadle 58 is depressed by foot power or otherwise to swing the member 53 on its pivot 54 and thus withdraw the cam face 55 from the groove 56 and out of engagement with the projection 51ª. The plunger 51 having by this operation been freed from restraint will be moved outwardly under the influence of the spring 52 into the path of the projections 62 on the clutch member 61. This clutch member 61 being fast on the shaft 50 will move one of the projections 62 into engagement with the projecting plunger 51 and thus operatively connect the sprocket 48 and connected mechanism with the driving shaft 50. The movement of the sprocket 48 will be transmitted to the sprocket 46 by means of the chain 47 and will thus bring about a rotation of the drum 28 and an actuation of the belts or aprons 34 which latter in turn, serve to rotate the roller 5 and through the medium of the gears 8 and 9 also actuate the roller 6. It is to be understood that pressure on the treadle 58 is immediately removed after the machine has been started as described, so that the treadle 58 is immediately returned to normal position under the influence of the spring 60 and the cam face 55 is consequently moved back into the groove 56, in which it is located during the rotation of the clutch member 49 as described. It will thus be seen that at the end of one complete revolution of the member 49 the lug 51ª will be returned into engagement with said cam face 55 and moved back thereby to return the plunger 51 to its initial position out of the path of the projections 62 and in consequence the clutch member 49 will be disconnected from the clutch member 61. In this manner the rotation of the drum 28 is automatically stopped, periodically, the illustrated form of my improvement as before stated showing this stoppage occurring twice during each revolution of the drum or in other words, the drum is brought to rest at the end of each half revolution, the sprockets 46 and 48 being proportioned to secure this result. It will, of course, be understood that the drum 28 may be stopped at the end of longer or shorter intervals, if this should be desired. If for any reason it should become necessary to bring the drum to a standstill before the automatic stoppage thereof is brought about as described, the treadle 72 is depressed and maintained in this condition as long as the operator desires the said drum 28 to remain at rest. The actuation of the treadle 72 will rock the bell crank 70 and will consequently move the collar 69 to the left in Fig. 2 and permit the arms of the clutch 68 to move toward the shaft 50 under spring action or otherwise and thus release said clutch 68 from operative engagement with the pulley 67. This pulley being loose on the shaft 50 will in this condition of the parts rotate idly, without in any way affecting the shaft 50. As soon as the pressure is removed from the treadle 72 the spring 74 will immediately return it to normal position and through a reverse operation of the bell crank 70 will move the collar 69 back toward the right in Fig. 2 and in consequence again operatively connect the clutch 68 with the pulley 67 to again drive the shaft 50.

During the operation of the machine the tobacco leaf $a$ which is to be stripped and booked is introduced between the rollers 5 and 6, the stem being located opposite the coöperating knives 10 and cutting disk 11 and the remainder of the leaf being opposite the sections 5ª, 6ª, 5ᵇ, 6ᵇ of said rollers at opposite sides of the cutting knives 10 and cutting disk 11. As the said leaf is fed between the rollers it will be cut, through the coöperation of the knives 10 with opposite faces of the disk 11, along opposite edges of the stem, thus cutting the stem out of the leaf or stripping the same as will be clearly apparent from an inspection of the drawings. During the cutting or stripping operation the stem of the leaf will pass between the knives 10 and press the ring 14 in a direction transverse to the axis of the roller 5 so that said ring becomes eccentric to said axis, the rubber or other yielding ring 13 permitting this movement and being placed under tension thereby. The tendency of the ring 13 to return to its normal condition will exert a pressure on the stripped stem and will force it from between the knives 10 thus preventing said stem from becoming wound about the ring 14 as otherwise would be the case. At any time during its passage through the rollers 5 and 6 the operation of the machine may be checked as before stated by simply depressing the treadle 72 in order to give the operator an opportunity to unfold or straighten out the leaf or to otherwise adjust the same for proper feeding between said rollers 5 and 6. From the rollers 5 and 6 the severed portions of the leaf $a$ pass downwardly between the aprons 34 and the felted surface 29 of the drum 28, the stripped stem simply dropping between the belts or aprons 34 to the floor or to a suitable receptacle. In this manner the severed portions of the leaf are finally removed from the rollers 5 and 6 and become deposited upon the drum 28 between the surface thereof and the respective aprons or belts 34 after which the movement of the drum is automatically arrested as hereinbefore set forth. After the treadle 58 has been again actuated a second leaf is introduced between the rollers 5 and 6 to strip in the same manner as described and is finally deposited on the drum 28 in the same manner, the sections of the two leaves being located behind each other on the drum as shown in Fig. 3. A third leaf which may not be stripped and fed forward in the manner set forth will become deposited on the first leaf on the drum, while a fourth will become deposited upon the second and so on, two separate pairs of bookings of stripped tobacco leaf being in this manner built upon the drum at diametrically opposite points between the surface thereof and each belt or apron 34. As the leaf accumulates or is booked in the manner described the aprons 34 will gradually move away from the periphery of the drum 28, the bell cranks 40 with the roller 39 swinging on the pivot 41 to allow for this yielding movement of the said aprons. The said aprons will, at all times and during all adjustments thereof as the booking proceeds, be maintained under proper tension by means of the weights 43. At the same time as the bookings increase in thickness or size, the booked leaf will exert a pressure toward the front of the machine and also toward the rear thereof against the drum 28, which pressure will cause the arms 31 to swing on the pivots 33 and the drum 28 in consequence to move away from the rollers 5 and 6. The drum 28 thus automatically adjusts itself to accommodate books of any thickness within its range of operation, the books being at all times firmly held on the drum by the aprons and the leaf consequently protected against injury. When the desired thickness of book has been secured the auxiliary frame 7ª is raised about its pivot 7ᵇ to the position shown in dotted lines in Fig. 3, a stop 7³ being provided to limit the said swinging movement of said auxiliary frame 7ª. After the auxiliary frame 7ª has been moved as described the first pair of books may be readily removed from the drum 28 after which, the drum is rotated to bring the second pair of books into a position of ready accessibility, after which this second pair of books may also be easily removed. The auxiliary frame 7ª may then be swung back into its former position to again make the machine ready for further operation, the various parts automatically and properly adjusting themselves during these manipulations. It will be seen that the tensioning device 63—64 permits the chain 47 to properly adjust itself during the swinging of the drum 28 on the pivots 33 so as to be at all times in proper operative connection with the sprockets 46 and 48.

It is, of course, to be understood that the drum 28 may be so proportioned and the machine otherwise so arranged that only one pair of books or more than two pairs of books may be accumulated thereon, the illustration being only an example of my improved machine.

If it is desired to strip tobacco leaf in which the stems are narrow, the sections 5ᵇ and 6ᵇ of the rollers 5 and 6 may be disconnected from the sections 5ª and 6ª and removed from the machine by a proper manipulation of the bolts 16 and 17, after which a narrow cutting disk 11 may be positioned on the stem 6ᶜ and the narrow bushing 12, collar 13, and collar 14 placed upon the stem 5ᶜ, the knives 10 being in this manner brought closer together to properly coöperate with the narrowed cutting disk 11, after which the sections 5ᵇ and 6ᵇ may be again connected with the sections 5ª and 6ª and the bolts 16 and 17 again properly adjusted. Similarly a wider cutting disk 11 with the knives 10 properly arranged may be inserted if desired. With this construction waste of tobacco leaf is at all times avoided and narrow and wider stems are stripped from the tobacco leaf with equal facility.

In the preferred construction as shown the drum 28 is so mounted as to have a tendency at all times to swing toward the front of the machine or toward the rollers 5 and 6 by its own weight and thus even when fully loaded with booked tobacco leaf to be prevented from dropping backward toward the rear of the machine. This arrangement avoids the necessity for using springs or analogous devices for securing this result.

It will be obvious that the stripping mechanism might be used independently of the present booking mechanism, which latter as will be apparent is also capable of independent use.

My improved machine is extremely simple in operation and construction and is easily operated or controlled by unskilled labor and is not likely to be disarranged or become out of order.

Various changes in the specific form shown and described may be made within the scope of the claims without departing from the spirit of my invention.

I claim:—

1. A machine of the kind described comprising means for feeding tobacco leaf, relatively stationary bearings for said feeding means, cutting means carried by said feeding means for removing the stem from the leaf, booking means adapted to receive the stripped leaf from said feeding means and automatically adjustable relatively thereto by pressure exerted by the booked leaf toward the feeding means as the booking proceeds and mechanism for actuating said means.

2. A machine of the kind described comprising means for feeding tobacco leaf, cutting means connected with said feeding means for removing the stem from the leaf, booking means adapted to receive the stripped leaf from said feeding means and automatically adjustable relatively thereto as the booking proceeds, a device for wiping said cutting means and mechanism for actuating said means.

3. A machine of the kind described comprising rollers adapted to feed tobacco leaf, coöperating cutting devices carried by each of said rollers for removing the stem from said leaf, a rotatable booking drum, an apron passing about said drum and one of said rollers and coöperating with said drum to receive the stripped leaf from said rollers and book the same, a movable support for said drum whereby the latter is moved away from the rollers by the pressure of the booked leaf toward the latter as the booking proceeds, means for maintaining said apron under tension and arranged to permit a movement thereof away from the surface of the drum as the books increase in thickness and mechanism for actuating said drum and rollers.

4. A machine of the kind described comprising a main frame, rollers journaled thereon and adapted to feed tobacco leaf, coöperating cutting devices carried by said rollers for removing the stem from said leaf, an auxiliary frame pivotally connected with said main frame and movable to an inoperative position, guide rollers on said main frame, additional guide rollers on said auxiliary frame, a booking drum rotatably mounted on said main frame, an apron passing about said drum and one of said feed rollers and over said guide rollers and coöperating with said drum to receive the stripped leaf from the feed rollers and book the same, a support for said drum pivoted on said main frame, whereby said drum is moved away from the feed rollers by the pressure of the booked leaf toward the latter as the booking proceeds, means arranged to permit said apron to move away from the surface of said drum as the books increase in thickness and adapted to maintain said apron under tension at all times and mechanism for actuating said drum and rollers.

5. In a machine of the kind described, a support, a pair of rollers mounted on said support and each comprising two detachably connected sections, cutting devices carried by said rollers between the sections thereof and detachably clamped in position by said sections, and mechanism for actuating said rollers.

6. In a machine of the kind described, a support, a pair of rollers mounted on said support and each comprising two detachably connected sections, a cutting disk carried by one roller between the sections thereof and detachably clamped in position by said sections, cutting knives carried by the other roller between the sections thereof and in contact with opposite faces of said cutting disk and detachably clamped in position by said sections and means for actuating said rollers.

7. In a machine of the kind described, a support, a pair of roller sections rotatably mounted on said support and each provided with a screw-threaded aperture, a second pair of roller sections removably mounted on said support and each provided with a screw-threaded stem adapted to coöperate with each aperture to connect the roller sections together, a cutting-disk mounted on one of said stems and clamped between the ends of the first roller sections, a pair of cutting knives on the second stem in contact with opposite faces of said cutting disk, a ring surrounding said bushing between said knives and capable of a movement transverse to the common axis thereof, and means for actuating said rollers.

8. In a machine of the kind described, a support, a pair of roller sections rotatably mounted on said support and each provided with a screw-threaded aperture, a second pair of roller sections removably mounted on said support and each provided with a screw-threaded stem adapted to coöperate with each aperture to connect the roller sections together, a cutting disk mounted on one of said stems and clamped between the ends of the first roller-sections, a bushing on the other stem, a pair of cutting knives on said bushing in contact with opposite faces of said cutting disk, a rigid ring between said knives for spacing them apart, a resilient ring surrounding said bushing between said knives and inside of said rigid ring whereby the latter is permitted to yield transversely of the axis of said roller and is returned to normal position and means for actuating said rollers.

9. In a machine of the kind described, a support, a pair of rollers mounted on said support and each comprising two detachably connected sections, a cutting disk carried by one roller and detachably clamped in position by the sections thereof, cutting knives carried by the other roller in contact with opposite faces of said cutting disk and detachably clamped in position by the sections of said rollers, resilient means between said knives adapted to be placed under tension to exert a pressure transversely of the axis of said roller and means for actuating said rollers.

10. In a machine of the kind described, cutting means whereby the stem is stripped from the leaf, means connected with said cutting means adapted to move transversely of the cutting means whereby the stripped stem is removed from said cutting means and means for actuating said cutting means.

11. In a machine of the kind described rotatable cutting knives spaced from each other, means coöperating with said knives for stripping the stem from the tobacco leaf, a resilient ring between said knives adapted to be placed under tension by the stem as the leaf is fed forward and to remove the stripped stem from between said knives and means for actuating said knives and cutting means.

12. In a machine of the kind described, cutting means whereby the stem is stripped from the leaf, resilient means adapted to remove the stripped stem from said cutting means, a booking device adapted to receive the stripped leaf, a pivoted support for said device whereby the latter is automatically moved away from said cutting means as the booking proceeds and means for actuating said booking device and cutting means.

13. In a machine of the kind described, cutting means whereby the stem is stripped from the leaf, resilient means adapted to remove the stripped stem from said cutting means, a drum adapted to receive the stripped leaf, a pivoted support for said drum whereby the latter is automatically moved away from said cutting means as the booking proceeds, an apron surrounding said drum and coöperating therewith to book the leaf, said apron being connected with said cutting means whereby a rotative movement of said drum is communicated to said cutting means and means for actuating said drum.

14. In a machine of the kind described rotatable cutting knives spaced from each other, means coöperating with said knives for stripping the stem from the tobacco leaf, a resilient ring between said knives adapted to be placed under tension by the stem and to remove the stripped stem from between said knives, a drum adapted to receive the stripped leaf, a pivoted support for said drum whereby the latter is automatically moved away from said cutting knives as the booking proceeds, an apron surrounding said drum and coöperating therewith to book the leaf, said apron being operatively connected with said cutting knives whereby a rotative movement of said drum is communicated to said cutting knives and coöperating means and means for actuating said drum.

In testimony whereof, I have hereunto set my hand in the presence of two subscribing witnesses.

OSCAR HAMMERSTEIN.

Witnesses:
JOHN A. KEHLENBECK,
G. V. RASMUSSEN.